(12) United States Patent
Miki et al.

(10) Patent No.: US 7,661,502 B2
(45) Date of Patent: Feb. 16, 2010

(54) PARKING BRAKE SYSTEM

(75) Inventors: Sosuke Miki, Saitama (JP); Yutaka Yamakura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 110 days.

(21) Appl. No.: 11/905,120

(22) Filed: Sep. 27, 2007

(65) Prior Publication Data

US 2008/0078601 A1    Apr. 3, 2008

(30) Foreign Application Priority Data

Sep. 29, 2006   (JP)   ............................ 2006-268420

(51) Int. Cl.
B62D 61/02   (2006.01)
(52) U.S. Cl. ..................... 180/219; 280/272; 188/24.11
(58) Field of Classification Search .................. 180/219; 280/272; 188/24.11
See application file for complete search history.

(56) References Cited

U.S. PATENT DOCUMENTS

| | | | | |
|---|---|---|---|---|
| 4,033,159 A * | 7/1977 | Bennett | ......................... | 70/233 |
| 4,038,847 A * | 8/1977 | Bennett | ......................... | 70/233 |
| 4,041,798 A * | 8/1977 | Shinozaki et al. | ............. | 74/512 |
| 4,852,701 A * | 8/1989 | Wakatsuki | ............... | 188/181 A |
| 6,450,301 B1 * | 9/2002 | Iizuka et al. | .................. | 188/26 |
| 7,140,474 B2 * | 11/2006 | Kojika | ......................... | 188/2 D |
| 7,232,014 B2 * | 6/2007 | Nakaie | ....................... | 188/71.1 |
| 7,350,881 B2 * | 4/2008 | Asahi | .......................... | 303/137 |
| 2002/0029940 A1 | 3/2002 | Iizuka et al. | | |
| 2005/0017477 A1 * | 1/2005 | Sato et al. | ..................... | 280/272 |
| 2005/0134114 A1 * | 6/2005 | Asahi | .......................... | 303/137 |
| 2005/0139433 A1 * | 6/2005 | Kojika | .......................... | 188/31 |
| 2006/0076197 A1 * | 4/2006 | Ishida | ......................... | 188/72.8 |
| 2006/0254842 A1 * | 11/2006 | Dagenais et al. | ............. | 180/215 |
| 2008/0011563 A1 * | 1/2008 | Yamamoto | ................... | 188/265 |
| 2008/0011576 A1 * | 1/2008 | Lin et al. | .................. | 192/219.4 |

FOREIGN PATENT DOCUMENTS

| | | |
|---|---|---|
| EP | 1 186 522 A2 | 3/2002 |
| EP | 1 186 524 A2 | 3/2002 |
| EP | 1 897 795 A1 | 3/2008 |
| JP | 2005-112307 A | 4/2005 |

* cited by examiner

*Primary Examiner*—Lesley Morris
*Assistant Examiner*—Tashiana Adams
(74) *Attorney, Agent, or Firm*—Birch, Stewart, Kolasch & Birch, LLP

(57) ABSTRACT

A parking brake operating lever is arranged to allow a rider to operate the operating lever without leaning forward to a large extent, while securely avoiding an inadvertent operation. An operating mechanism for a parking brake is provided to a position, covered with a front cowl, of a right-side main pipe, below a tank cover. The operating lever is positioned to be partly exposed from a lower end portion of the side surface of the front cowl. Since the operating lever is positioned in a vicinity of the front end portion of a seat, the operating lever is easy to operate. Concurrently, since the most part of the operating lever is covered with the front cowl, an inadvertent operation is avoided.

24 Claims, 13 Drawing Sheets

PARKING BRAKE SYSTEM

CROSS-REFERENCE TO RELATED APPLICATIONS

This nonprovisional application claims priority under 35 U.S.C. §119(a) on Patent Application No. 2006-268420, filed in Japan on Sep. 29, 2006, the entirety of which is incorporated herein by reference.

BACKGROUND OF THE INVENTION

1. Field of the Invention

The present invention relates to a parking brake system for motorcycles. In particular, the present invention relates to the advantageous arrangement structure of an operating lever of the parking brake system.

2. Background of the Invention

Some motorcycles, especially some scooter-type vehicles, are provided with a parking brake. An operating lever of the parking brake is provided to a front cover in a vicinity of a steering shaft of a handlebar. (See, for example, Japanese Patent Application Laid-open Publication No. 2005-112307).

The operating lever of the parking brake has been conventionally positioned far apart from, and in front of, a handlebar grip. For this reason, the rider has been required to lean forward considerably for operating the operating lever. Accordingly, it is desirable that the operability be improved by disposing the operating lever in a vicinity of the handlebar grip. However, in this case, since the operating lever is positioned near the rider, it is required to securely prevent an inadvertent operation, which is more likely to occur. The present application fulfills such a demand.

SUMMARY OF THE INVENTION

For the purpose of solving the above-described problem, a first aspect of the present invention provides a parking brake system for a motorcycle provided with a parking brake for locking a wheel at the time when the motorcycle is parked. The parking brake system includes: a head pipe, a front cowl, an operating mechanism for the parking brake, and an operating lever of the operating mechanism. The head pipe supports a front wheel, while the front cowl covers a region from a portion in front of the head pipe to a portion on the front side of a seat disposed in the center of the vehicle body. In the parking brake system, the operating mechanism for the parking brake is disposed in front of the seat, inside the front cowl. In addition, in the parking brake system, the operating lever is partly exposed downward from the lower portion of the front cowl, which is opening downward.

According to a second aspect of the present invention, the parking brake system for a motorcycle according to the first aspect further includes a pair of right and left main pipes extending rearward from the head pipe. In the parking brake system, the operating mechanism for the parking brake is fixed to one of the main pipes.

According to a third aspect of the present invention, the operating lever for the parking brake is pivotally supported so as to be swingable in the front-and-rear direction along the corresponding main pipe.

According to the present application, the operating mechanism of the parking brake is provided inside the front cowl covering a portion from the head pipe to a vicinity of the seat. At the same time, the operating lever is partly exposed downward from the portion of the front cowl, which opens downward, at the position in front of, and in the vicinity of, the front end portion of the seat in the side view. This allows the rider to operate the operating lever without leaning forward to a large extent, so that the operability is improved. On the other hand, since the operating mechanism of the parking brake is housed inside the front cowl, it is possible to avoid an inadvertent operation.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
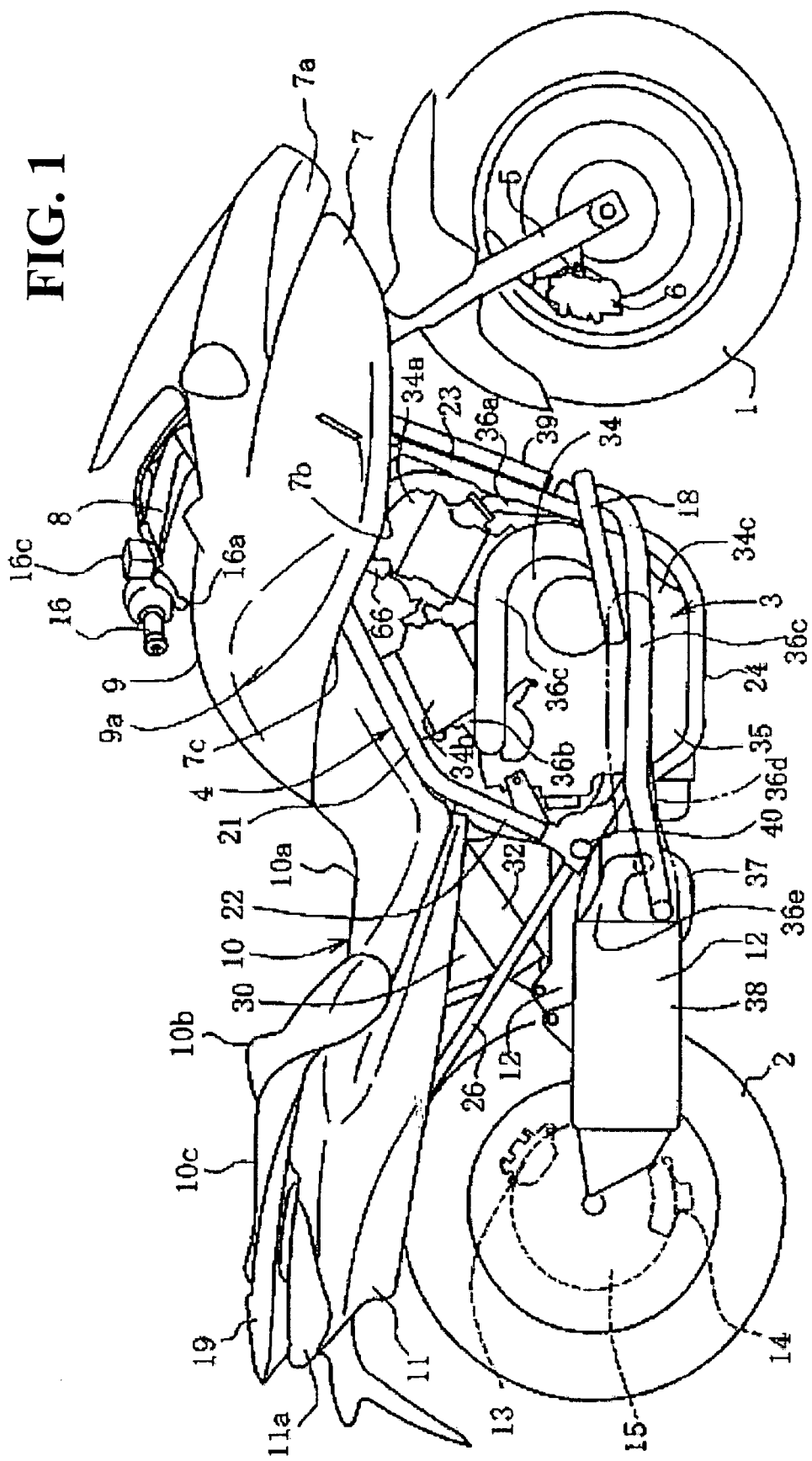
FIG. 1 is a right-side view showing a motorcycle according to a first embodiment.

The present invention will now be described in detail with reference to the accompanying drawings, wherein the same reference numerals will be used to identify the same or similar elements throughout the several views. It should be noted that the drawings should be viewed in the direction of orientation of the reference numerals.

FIG. 1 is a right-side view of a motorcycle according to the embodiment. A power unit 3 is arranged between a front wheel 1 and a rear wheel 2, and is supported by a vehicle body frame 4. Reference numeral 5 identifies a front fork. Reference numeral 6 identifies a front brake. Reference numerals 7 and 7a identify a front cowl and a front lighting unit, respectively. Reference numeral 8 identifies a handlebar. Reference numeral 9 identifies a tank cover. Reference numerals 10, 10a, 10b and 10c identify a seat, a front seat, a backrest and a rear seat, respectively. Reference numerals 11 and 11a identify a rear cowl and a rear lighting unit, respectively. Reference numeral 12 identifies a rear arm. Reference numeral 13 identifies a rear brake. Reference numeral 14 identifies a parking brake. Reference numerals 16, 16a and 16c identify a handlebar grip (the right side is shown), a right-side lever and a front master cylinder, respectively. The operation of the lever 16a causes the front master cylinder 16c to activate the hydraulic front brake. Reference numeral 19 identifies a grab rail.

The grip 16 of the handlebar 8 is positioned above the top portion of the tank cover 9, and extends rearward to a large extent so as to reach a portion above a bank space formed between a front cylinder 34a and a rear cylinder 34b. An operating lever 66 of the parking brake is positioned below the grip 16. The operating lever 66 is positioned in front of, and in a vicinity of, the front end portion of the seat 10 in the side view. Concurrently, the operating lever 66 is exposed downward, facing a vicinity of a portion where a main pipe 21 intersects a lower end portion (hereinafter referred to as the lower side end portion) 7b of the side surface of the front cowl 7 which opens downward. A rear portion 7c of the lower side end portion 7b extends obliquely rearward and upward in the side view so as to overlap a front edge portion of the seat 10 positioned at the center of the vehicle body.

The portion where the main pipe 21 intersects the lower side end portion 7b of the front cowl 7 is the uppermost portion in the V-shaped space of the bank formed between the front cylinder 34a and the rear cylinder 34b. The operating lever 66 faces the V-shaped space. Concave portions 9a for knee grip are formed respectively in the side faces of the rear portion of the tank cover 9 so as to be held by the knees of the rider straddling the seat 10. Reference numeral 18 identifies a step, which is positioned near the lower portion of the side surface of a crankcase 34c. The front end portion of the step 18 intersects a down pipe 23 and protrudes forward of the down pipe 23, while the grip 16 is positioned above the rear end portion of the step 18.

Figure 2:
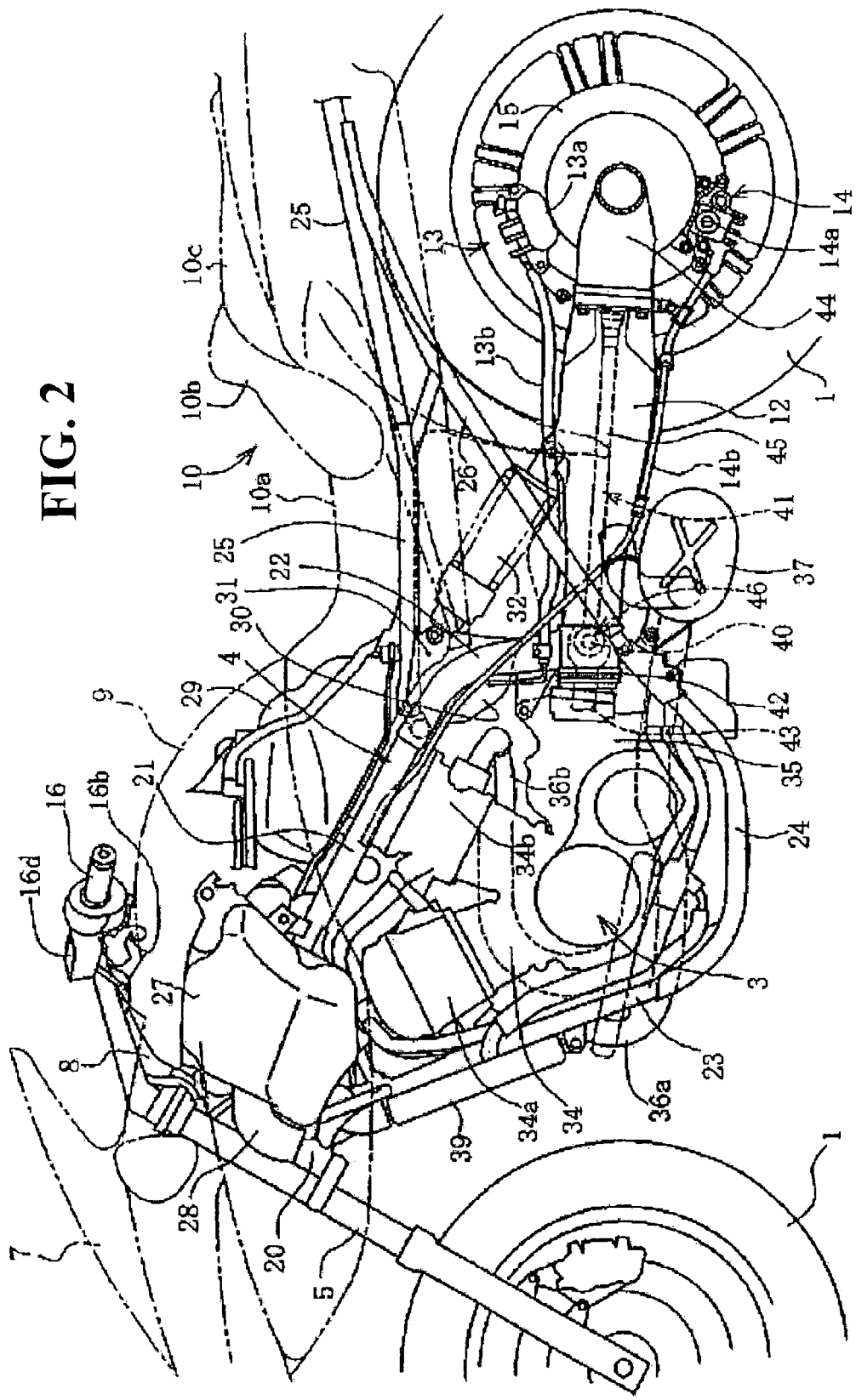
FIG. 2 is a side view showing a chief part of the left front portion of the vehicle body.

FIG. 2 is a side view showing a chief part of the front portion of the left side of the vehicle body. The vehicle body frame 4 includes a head pipe 20, the main pipe 21, a center pipe 22, the down pipe 23 and a lower pipe 24, and forms a loop in which these pipes are successively connected one to another. The head pipe 20 supports the front wheel 1 with the front fork 5 in between. The main pipe 21 extends from the head pipe 20 rearward above the power unit 3. The center pipe 22 is arranged rearward of the power unit 3, and extends in the up-and-down direction. The down pipe 23 extends from the head pipe 20 downward on the front side of the power unit 3, and the lower pipe 24 is arranged downward of the power unit 3, and extends in the front-and-rear direction. In this manner, the vehicle body frame 4 supports the power unit 3 in these pipes (within the space defined by the head pipe 20, the main pipe 21, the center pipe 22, the down pipe 23 and the lower pipe 24). A seat rail 25 extends rearward substantially in the horizontal direction from a vicinity of the portion where the main pipe 21 and the center pipe 22 are connected to each other. In addition, the vehicle body frame 4 is provided with a backstay 26 obliquely connecting the center pipe 22 and the seat rail 25.

The front fork 5 is rotatably supported by the head pipe 20. The front end portion of the main pipe 21 and the upper end portion of the down pipe 23 are joined to the head pipe 20. An air cleaner 27 is supported, rearward of the head pipe 20, and in a vicinity of the front end portion of the main pipe 21. An air duct 28 extends forward from the front surface of the air cleaner 27, and is bent downward on the lateral side of the head pipe 20, so as to intake the outside air from below. A first fuel tank 29 is supported, on the middle portion of the main pipe 21 in the front-and-rear direction, and on the front portion of the seat rail 25, rearward of the air cleaner 27.

A second fuel tank 30 is supported by the seat rail 25, rearward and downward of the first fuel tank 29. The second fuel tank 30 is housed in a space surrounded by the center pipe 22, the seat rail 25 and the backstay 26. The front portion of the second fuel tank 30 overlaps a part of the first fuel tank 29 in the upper-and-lower direction.

A stay 31 that extends upward and rearward is provided to a shoulder portion of a vicinity of a portion where the upper portion of the center pipe 22 is bent forward so as to be connected to the main pipe 21. The upper portion of a cushion unit 32 constituting a rear suspension is supported by the stay 31. The stay 31 is arranged to the left side of the vehicle body. The cushion unit 32 extends obliquely downward and rearward on the left side of the vehicle body while the lower portion of the cushion unit 32 is supported on the middle portion of the rear arm 12.

The power unit 3 includes an engine 34 and a mission case 35. The engine 34 is a water-cooled 4-stroke V-type engine. The engine 34 is provided with the front cylinder 34a, the rear cylinder 34b and the crankcase 34c. Exhaust pipes 36a and 36b that extend respectively from the front cylinder 34a and the rear cylinder 34b are joined into a collecting pipe 36c on the right side of the engine 34. The collecting pipe 36c extends from the right side of the vehicle body, and is connected to a first muffler 37 positioned in a vicinity of the rear side of the mission case 35 and below the rear arm 12. Reference numeral 36d identifies an exhaust pipe cover. The first muffler 37 is disposed to extend in the vehicle width direction. A rear-side exhaust pipe 36e extends rearward from the right side of the first muffler 37, and is connected to a second muffler 38 disposed to extend towards the right side of the rear arm 12 in the front-and-rear direction. A radiator 39 is supported on the down pipe 23, and cools down the engine 34. Reference numeral 40 identifies a pivot shaft provided at the middle portion of the center pipe 22 in the up-and-down direction.

The front end portion of the rear arm 12 is supported on the pivot shaft 40 provided at the middle portion of the center pipe 22 in the up-and-down direction so that the rear arm 12 swings in the up-and-down direction. The rear wheel 2 is supported on the right side of the rear end portion of the rear arm 12.

The drive type of the rear wheel 2 is a shaft drive type. The rotational output at an output shaft 43 of the power unit 3 is transmitted via a shaft drive mechanism 41 to a gear box 44 formed in the left side portion of the rear end portion of the rear arm 12, so as to rotationally drive the rear wheel 2.

A brake disk 15 is attached to the rear wheel 2 to rotate together with the rear wheel 2. The rear wheel 2 is braked with the brake disk 15 by a hydraulic brake caliper 13a of the rear brake 13 and a manual caliper 14a of the parking brake 14. The hydraulic brake caliper 13a is attached to the gear box 44, and is operated with hydraulic pressure sent through a brake hose 13b disposed along the upper surface of the rear arm 12. The manual caliper 14a is also attached to the gear box 44, and is operated with a brake cable 14b disposed along the lower surface of the rear arm 12. The hydraulic brake caliper 13a and the manual caliper 14a are provided respectively to positions substantially symmetric to each other in the up-and-down direction on the brake disk 15.

The brake cable 14b passes over the center pipe 22 above the pivot shaft 40, extends forward along the lower surface of the main pipe 21, and is then connected to a parking lever (see FIG. 5) provided to the main pipe 21. The parking brake 14 is manually operated with the operation of the lever.

The brake hose 13b extends upward in a vicinity of the pivot shaft 40, thereafter extends forward along the lower surface of the main pipe 21 together with the brake cable 14b, and is then connected to a rear master cylinder 16d provided in a vicinity of the left-side grip 16 of the handlebar 8. Hydraulic pressure is sent through the brake hose 13b to the rear brake 13 with the operation of the left-side lever 16b so that the caliper 13a is operated with the hydraulic pressure.

Figure 3:
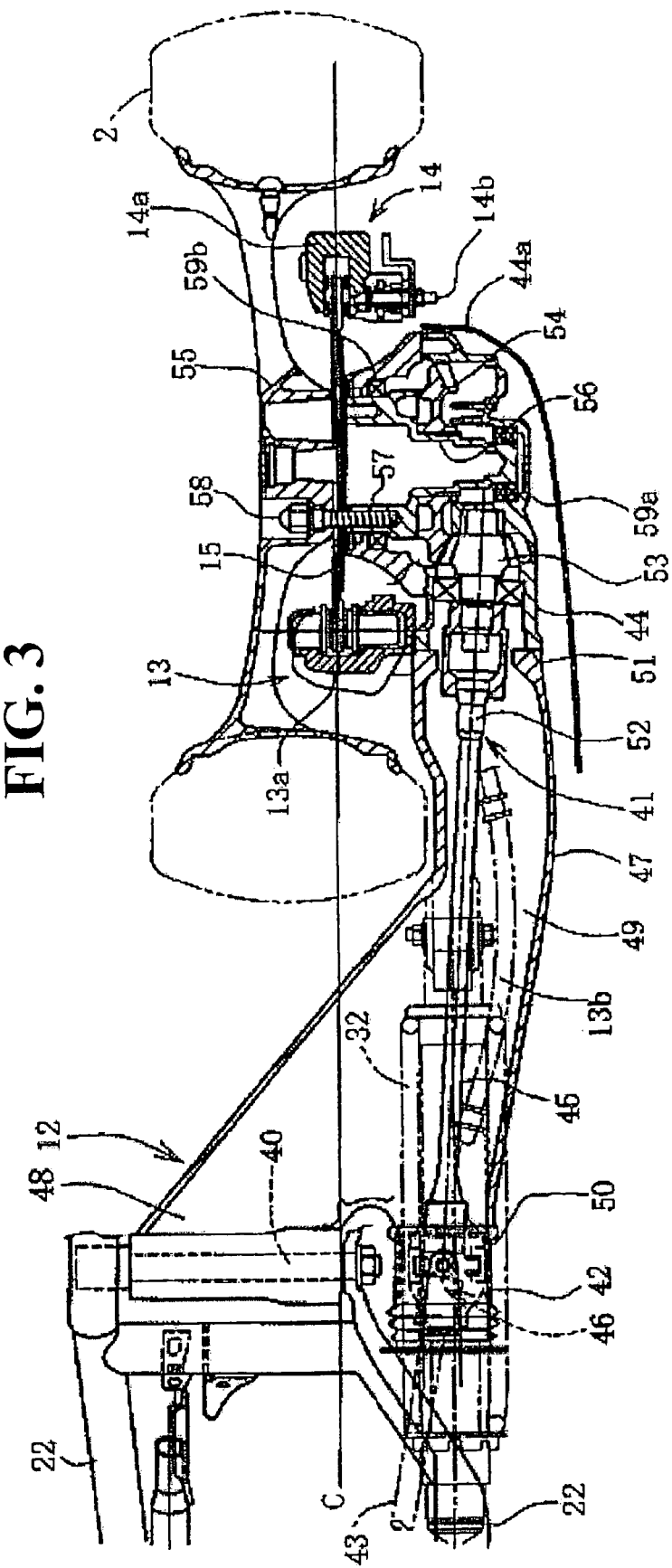
FIG. 3 is a horizontal cross-sectional view showing a rear arm.

FIG. 3 is a horizontal cross-sectional view of the rear arm 12. The output shaft 43 and a drive shaft 45 are joined to each other with a universal joint 46, which is covered with a joint boot 42.

An arm portion 47 and a cross portion 48 are integrally formed in the rear arm 12. The arm portion 47 extends in the front-and-rear direction on the left side of the vehicle body, while the cross portion 48 expands in the vehicle width direction on the front portion of the arm portion 47, so that the entire rear arm 12 is formed into a hollow shape. The cross portion 48 is formed into a substantially triangle in plan view in front of the rear wheel 2. The inside of the arm portion 47 forms a shaft path 49 penetrating therethrough in the front-and-rear direction. The drive shaft 45 is inserted in the front-and-rear direction through the shaft path 49. The rear end portion of the joint boot 42 is attached to a front-side opening portion 50 of the shaft path 49. The front end portion of the drive shaft 45 is joined to the universal joint 46 housed in the joint boot 42.

A gear shaft 52, which is connected to the rear end of the drive shaft 45, projects into the gear box 44 from a rear-side opening portion 51 of the shaft path 49. A shaft-side beveled gear 53 attached to the rear end of the gear shaft 52 engages an axle-side beveled gear 54. The axle-side beveled gear 54 is connected to one end of a drive axle 56 penetrating a hub 55 of the rear wheel 2 in the vehicle width direction. The other end of the drive axle 56 is connected to, and combined with, the hub 55 with a bolt 57 and a nut 58.

The rotational driving power of the drive shaft 45 is transmitted from the shaft-side beveled gear 53 to the axle-side beveled gear 54 so as to rotate the drive axle 56, and further rotationally driving the rear wheel 2 combined with the drive axle 56 with the hub 55. The drive axle 56 is supported to the gear box 44 on bearings 59a and 59b. The brake disk 15 is held at the interstice between the drive axle 56 and the hub 55. The brake disk 15 is fastened together when the hub 55 is attached and bolted to the drive axle 56.

The hydraulic brake caliper 13a of the rear brake 13 moves a piston with hydraulic pressure supplied from the brake hose 13b so as to press a brake pad against the brake disk 15 to perform the braking. The manual caliper 14a of the parking brake 14 presses a brake pad against the brake disk 15 at the time when the brake cable 14b is pulled, so as to perform the braking. Since both of the brake caliper 13a and the manual caliper 14a are publicly known configurations, detailed descriptions will be omitted of those calipers.

Figure 4:
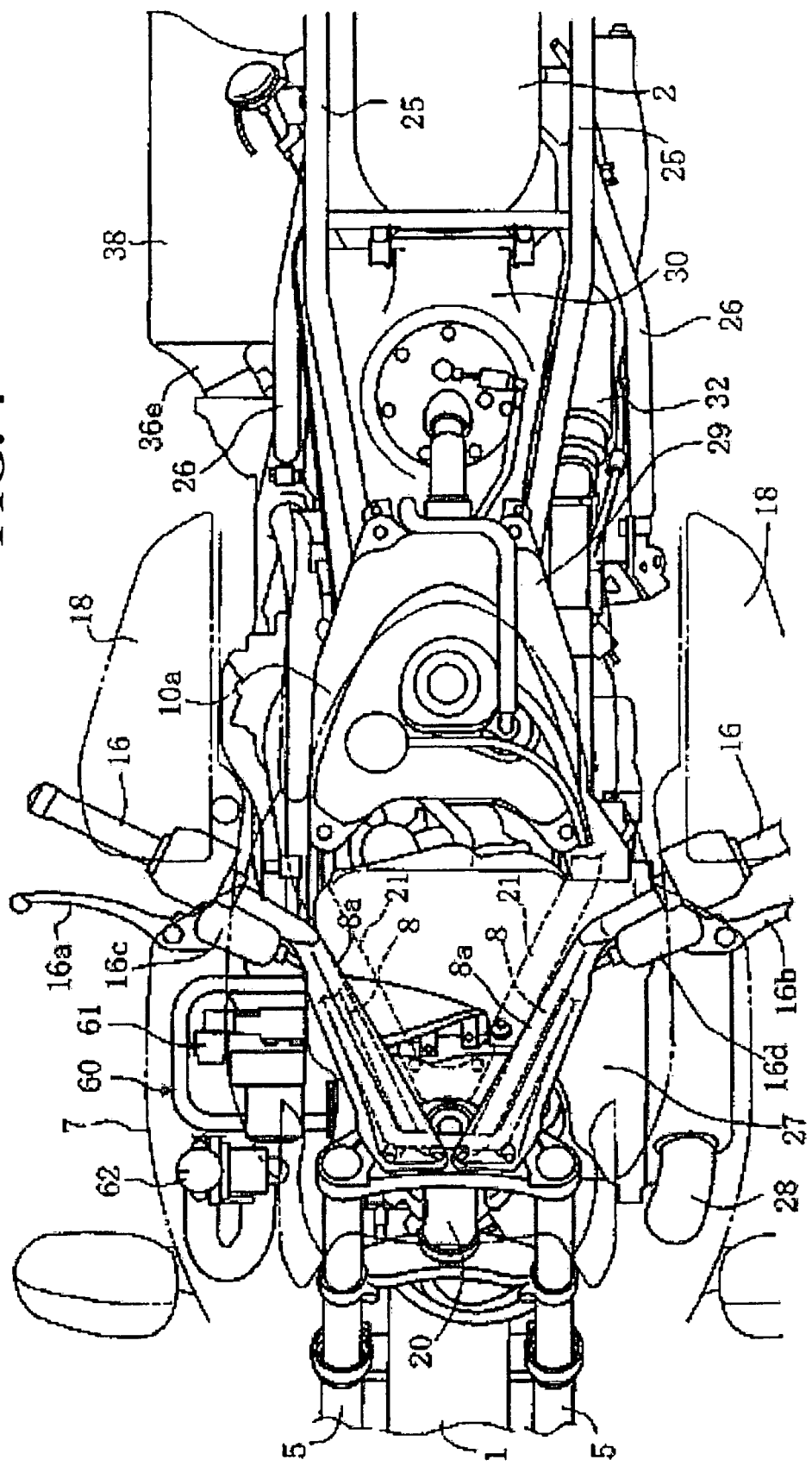
FIG. 4 is a plan view showing a chief part of the front portion of the vehicle body.

FIG. 4 is a plan view of a chief part of the front portion of the vehicle body. In FIG. 4, the front cowl 7 is indicated by an imaginary line, and also the illustration of the tank cover is omitted. The handlebar 8 is covered with a handlebar cover 8a, and extends rearward to a large extent on the right and left side so as to form a substantially V shape excluding the top portion. Each of the front fork 5, the main pipe 21, the seat rail 25 and the backstay 26 is provided on each of the right and left sides so as to be paired with each other. The air cleaner 27 is provided across the vehicle body in the vehicle width direction in front of the first fuel tank 29. A part of the front portion of the air cleaner 27 on the left side of the vehicle body projects forward so that a large capacity is secured.

A unit supporting stay 60 projecting outward with a substantially block U shape is provided in a vicinity of the grip 16 on the right side of the vehicle body. An ABS modulator 61 is supported on the unit supporting stay 60. The ABS modulator 61 is a publicly known hydraulic modulator which controls and reduces the hydraulic pressure of the front brake 6 so as to avoid the locking of the wheel.

A water filling cap 62 of the radiator 3 is disposed in front of the ABS modulator 61. The ABS modulator 61 and the water filling cap 62 are disposed and housed in the front cowl 7, outside the main pipe 21. This part is supported on the side surface of an inclined portion of the main pipe 21 located forward of a portion of the main pipe 21 with the largest width between the two main pipes 21 diverging from the head pipe 20 respectively to the right and left, while the front cowl 7 covering the front side of the inclined portion has a streamlined and curved surface. Accordingly, the front cowl 7 and the inclined portion form a relatively large space in between. For this reason, the ABS modulator 61 and the water filling cap 62 are easily housed in the space between the front cowl 7 and the inclined portion. Moreover, even in a case where the space is used as a housing space, disposing the ABS modulator 61 and the water filling cap 62 within the maximum width between the two main pipes 21 eliminates the necessity for enlarging the width of the vehicle body.

Figure 5:
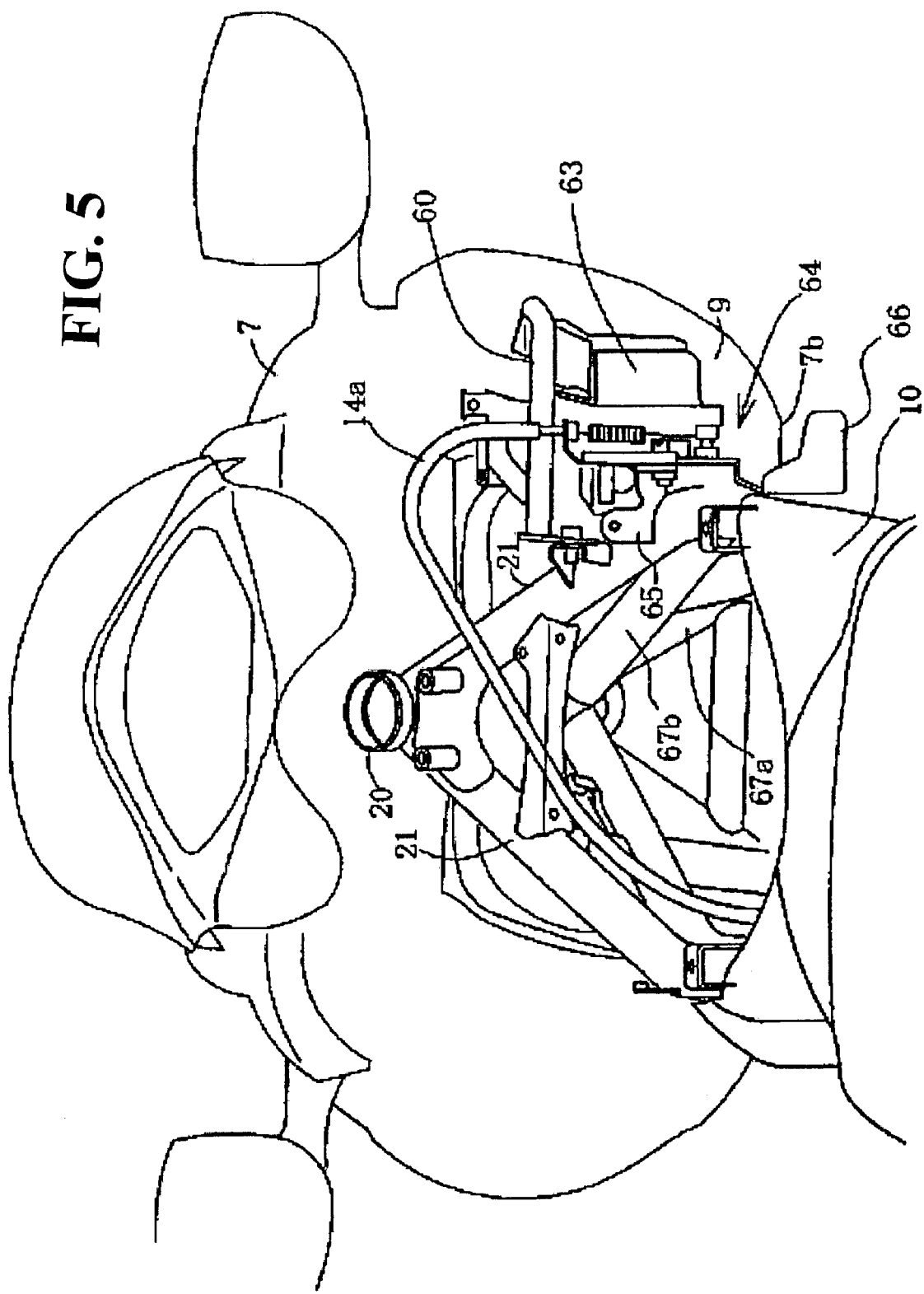
FIG. 5 is a perspective view showing a portion where an ABS modulator is supported.

FIG. 5 is a perspective view showing the portion where the ABS modulator 61 is supported as seen from behind the tank cover 9 in a state where the inside of the tank cover 9 is assumed to be transparent. The right and left main pipes 21 that are paired with each other diverge rearward from the head pipe 20. The unit supporting stay 60 projects rightward from the right side of the main pipes 21 to a space on the inner side of the front cowl 7. In addition, in the front cowl 7 positioned in front of the front end portion of the seat 10, a portion where the front cowl 7 continues to the tank cover 9, and where the air cleaner 27 is housed above the front cylinder 34a and in front of the first fuel tank 29 (see FIG. 4) is a portion with the largest width expanding in the vehicle width direction. The ABS modulator 61 and an operating mechanism 64 of the parking brake are disposed below a vicinity of the portion with the largest width.

A bracket 63 is provided to the unit supporting stay 60. The ABS modulator 61 (not shown) is supported on the bracket 63. In addition, the operating mechanism 64 of the parking brake is provided to the rear of the unit supporting stay 60. The bracket 63 includes a base plate 65 provided on the corresponding main pipe 21 and the operating lever 66. The front end of the brake cable 14b is connected to a plate (described later) rotated in response to the operation of the operating lever 66.

The operating mechanism 64 is provided on the right side of the vehicle body so that the operating lever 66 is operated by the rider with the right hand. The brake cable 14b extends upward from the operating mechanism 64 on the right side of the vehicle body, and is then bent towards the left side of the vehicle body. The brake cable 14b further extends rearward along the main pipe 21 on the left side, and consequently extends to the parking brake 14, disposed on the left side of the vehicle body, of the rear wheel 2 (see FIGS. 2 and 3).

The side surface of the front cowl 7 is curved and projects outward. The unit supporting stay 60 is disposed in a space on the inner side of the outermost projecting portion of the side surface of the front cowl 7. The lower side end portion 7b of the front cowl 7 gets closer to the center of the vehicle body, as approaching the front end of the seat 10. Accordingly, the position of the lower side end portion 7b is narrowest at a portion where the lower side end portion 7b is connected to the front end of the seat 10. The operating lever 66 is exposed downward of the lower side end portion 7b at a portion, where a leg of the rider is unlikely to touch the operating lever 66, in front of the position where the width starts to be narrower, and concurrently in front of the position of the concave portion 9a (see FIG. 1) for knee grip.

Figure 6:
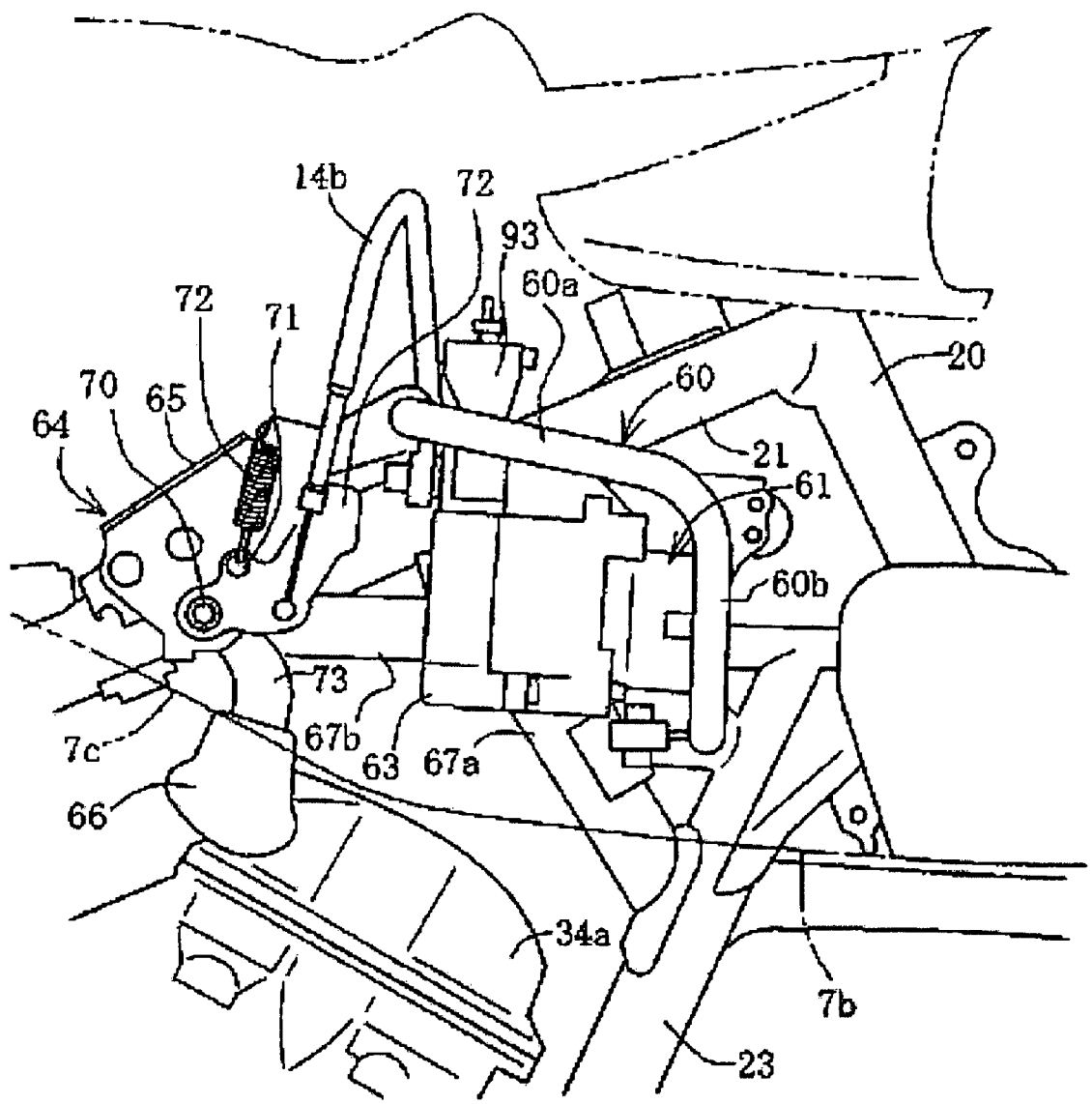
FIG. 6 is a side view showing the ABS modulator and an operating mechanism.

FIG. 6 is a side view showing a portion where the ABS modulator 61 and the operating mechanism 64 are located. The ABS modulator 61 is positioned above the front cylinder 34a, while the operating mechanism 64 is positioned above and rearward of the top portion of the front cylinder 34a. The bracket 63 having a substantially L-shape is supported below the unit supporting stay 60, and the ABS modulator 61 is supported on the bracket 63.

Figure 7:
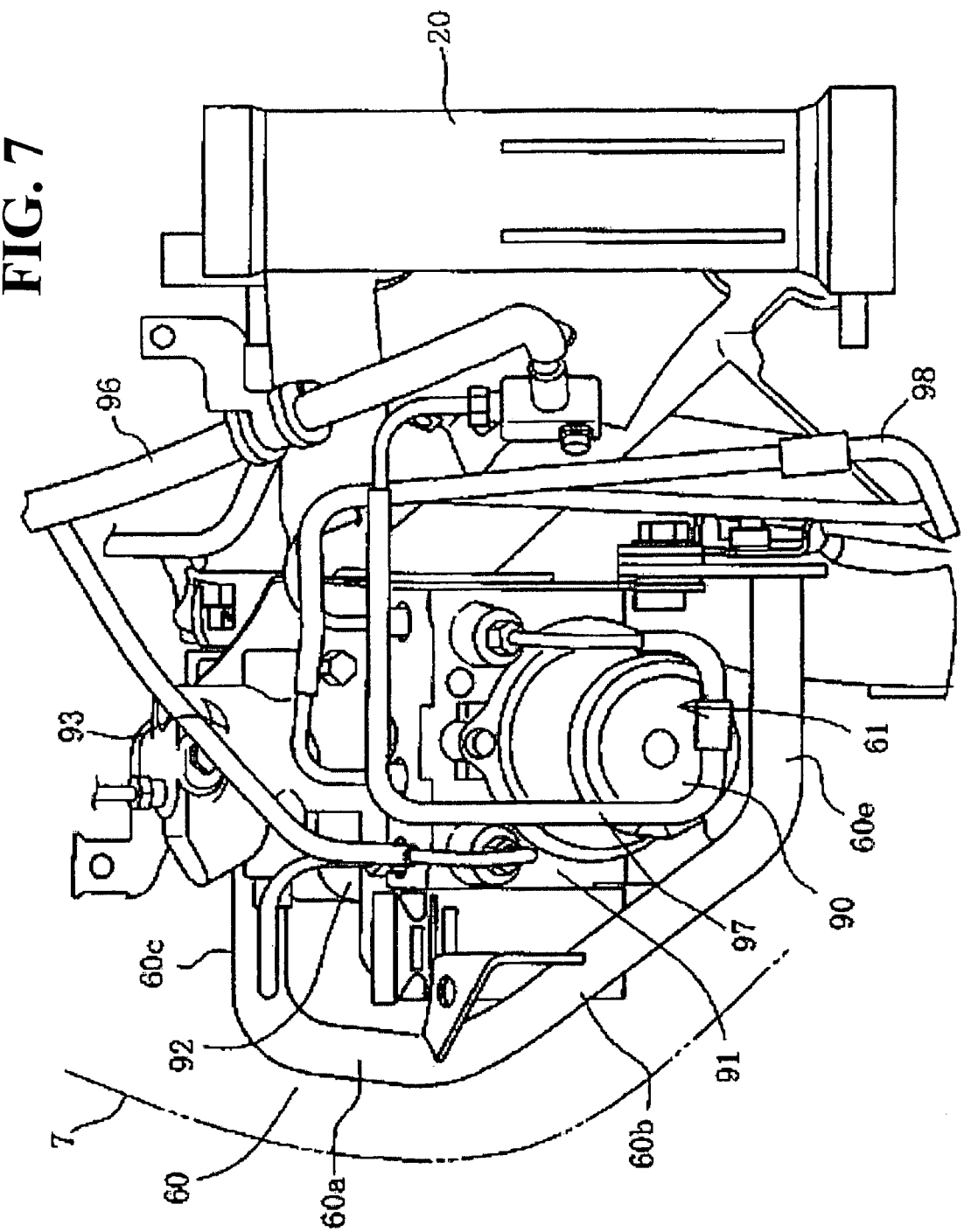
FIG. 7 is a diagram showing a state where the ABS modulator is attached.

FIG. 7 is a view from the front of the vehicle body, showing a state where the ABS modulator 61 is attached. The unit supporting stay 60 projects towards the side of the vehicle body inside the front cowl 7, while the lower portion of the unit supporting stay 60 is inclined obliquely outward and upward from the bottom. Accordingly, the lower portion of the unit supporting stay 60 protrudes to a small extent, so that the lower portion of the front cowl 7 is prevented from projecting outward to a large extent, thus preventing the bank angle from increasing. The ABS modulator 61 is surrounded by, and is positioned in, the unit supporting stay 60. The unit supporting stay 60 functions also as a guard member for the outer side portion of the ABS modulator 61. Reference numeral 96 in the figures identifies a brake hose extending from the front master cylinder 16c. The brake hose 96 is connected to a pump 91 with a joint pipe 97 in between. Reference numeral 98 identifies a hose connecting the pump 91 with the front brake 6.

The ABS modulator 61 is positioned outward of the front portion of the vehicle body frame constituted of the head pipe 20, the main pipes 21, the down pipes 23, a reinforcement pipe 67a and the like. This configuration eliminates the need for laying out the ABS modulator 61 inside the front portion of the vehicle body frame, thus facilitating the layout. In addition, the ABS modulator 61 is not disposed in a space behind the head pipe 20, and on the inner side of the main pipes 21. This configuration also prevents the space for the arrangement of other components including the induction system disposed in this portion from being compressed.

Figure 8:
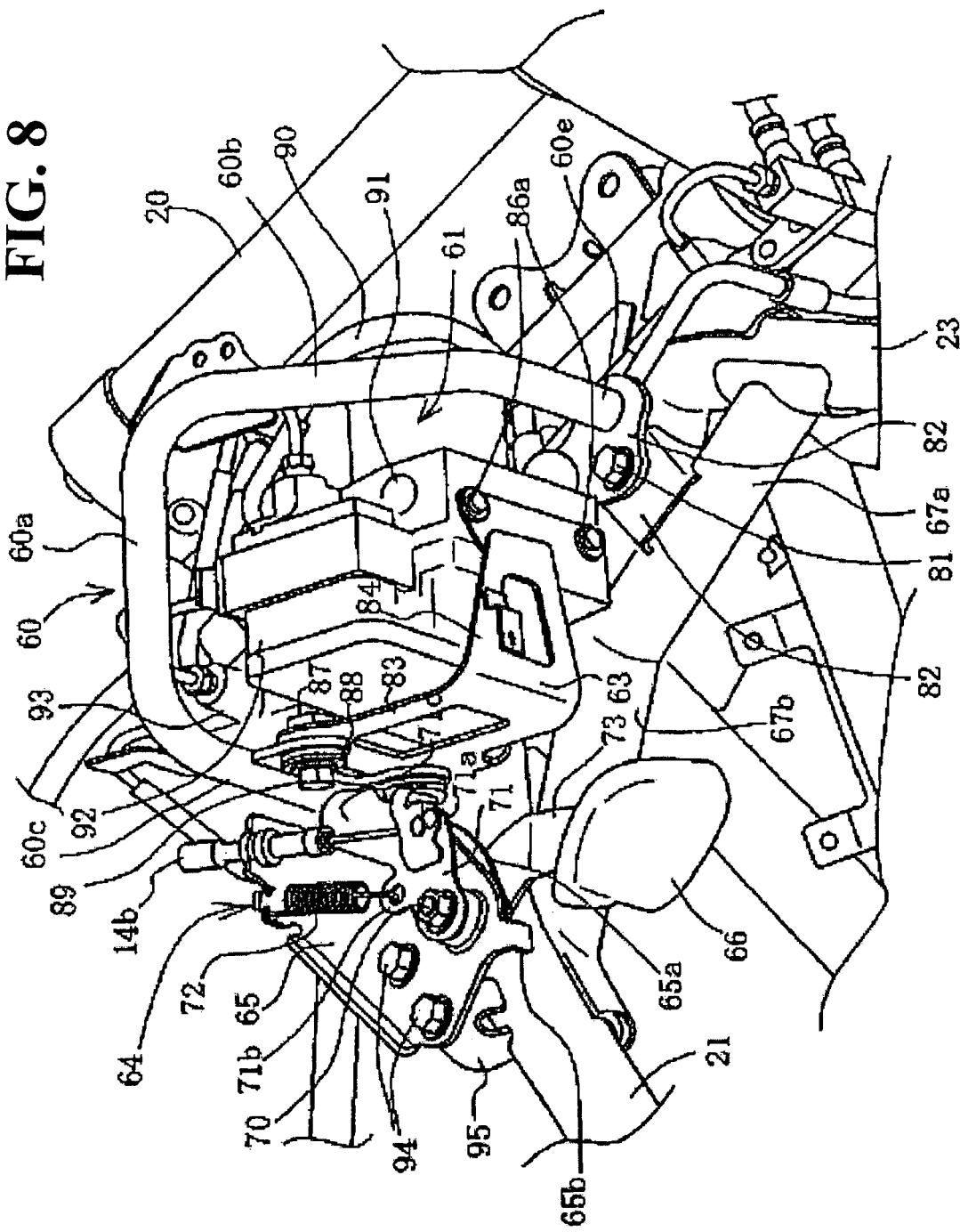
FIG. 8 is a perspective view showing the state where the ABS modulator is attached.

FIG. 8 is a perspective view from the rear and lower side, showing the state where the ABS modulator 61 is attached. The ABS modulator 61 is placed on the bracket 63. The bottom portion of the ABS modulator 61 is attached to the bracket 63 with a rubber mount 63a in between. The rear portion of the ABS modulator 61 is also attached thereto with a rubber mount as well. Accordingly, the entirety of the ABS modulator 61 is supported on the bracket 63 while vibrations of the ABS modulator 61 are suppressed. The ABS modulator 61 is a unit for controlling the hydraulic pressure, in which an electric motor 90, the pump 91 and a solenoid valve 92 are combined together. Reference numeral 93 identifies an actuator.

As described above, in the front cowl 7, the ABS modulator 61 and the operating mechanism 64 of the parking brake are disposed below the vicinity of the portion with the largest width continuing to the tank cover 9. Accordingly, there is no need for increasing the width of the front cowl 7 more than the width of the largest width for the purpose of disposing these components. This makes it possible to easily secure the arrangement space outside the vehicle body frame.

Figure 9:
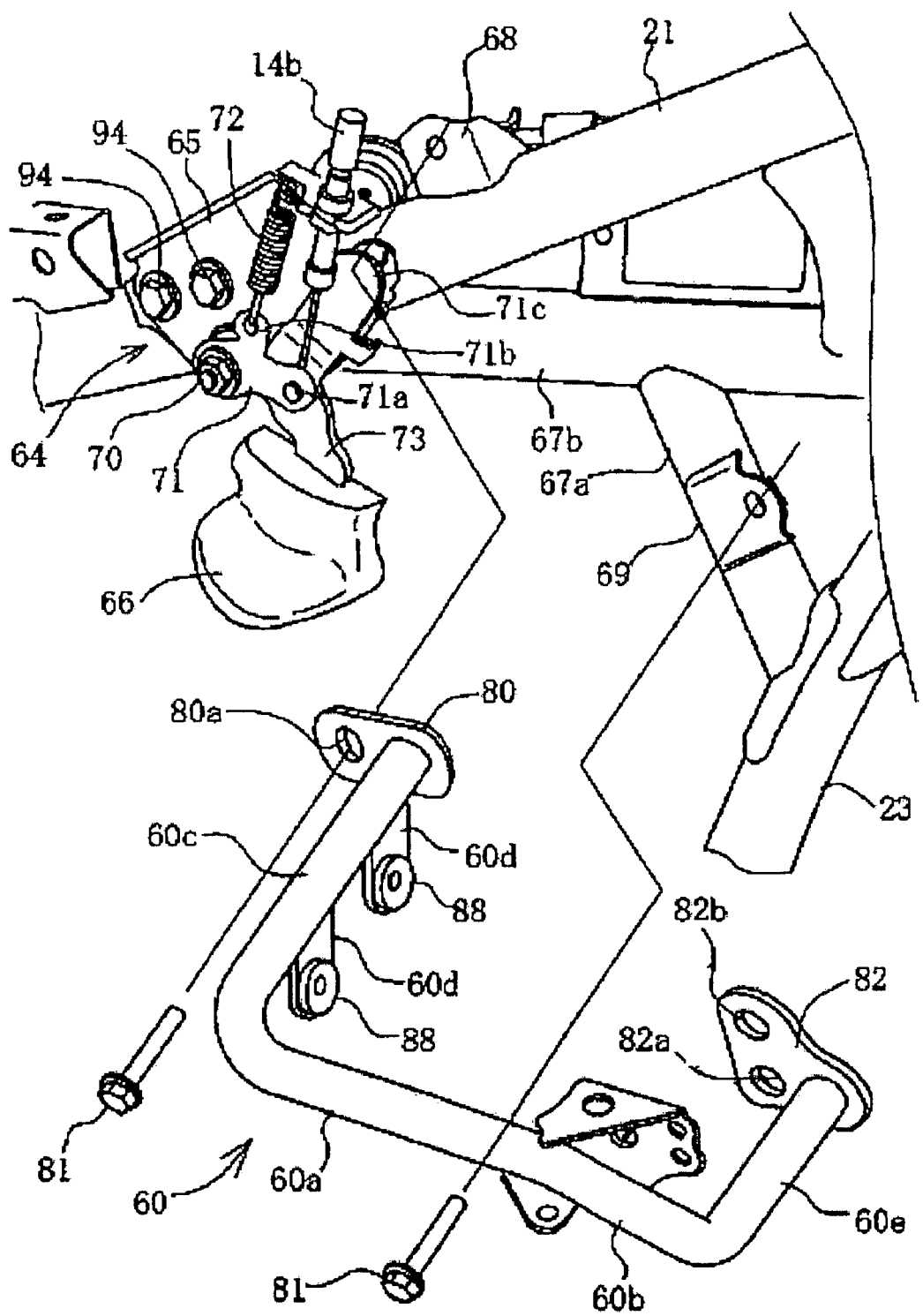
FIG. 9 is a diagram showing a state where the unit supporting stay is attached.

FIG. 9 shows a structure in which the unit supporting stay 60 is attached. The vehicle body frame where the unit supporting stay 60 is to be attached includes the reinforcement pipe 67a and a reinforcement pipe 67b. The reinforcement pipe 67b obliquely joins the lower portion of the head pipe 20, the front end portion of the down pipe 23 and the main pipe 21. The reinforcement pipe 67a obliquely joins the reinforcement pipe 67b and the down pipe 23. A stay 68 is welded to the main pipe 21 while a stay 69 is welded to the reinforcement pipe 67a. A weld nut (not shown) is formed on each of the stays 68 and 69.

The unit supporting stay 60 includes an upper portion 60a, a front portion 60b and a rear lateral portion 60c. The upper portion 60a extends, in the front-and-rear direction, substantially horizontally in the side view. The front portion 60b is bent, and extends below, from the front end of the upper portion 60a. The rear lateral portion 60c is bent inward at a right angle, and extends inward in a horizontal direction, from the rear end of the upper portion 60a. A stay 60d is formed on, and projects downward from, the rear lateral portion 60c. A front lateral portion 60e is provided to the front portion 60b. The front lateral portion 60e is bent at a right angle, and extends inward in parallel to the rear lateral portion 60c, from the lower end of the front portion 60b. These portions are formed continuously and integrally of one single pipe member.

A bracket 80 is provided to one end of the rear lateral portion 60c. A through hole 80a is formed in one end of the bracket 80. A bolt 81 is inserted via the through hole 80a into the weld nut of the stay 68 welded on the main pipe 21, so that the rear lateral portion 60c is detachably attached to the stay 68. In the same manner, a bracket 82 with a through hole 82a is provided to one end of the front lateral portion 60e. A bolt 81 is inserted via the through hole 82a into the weld nut of the stay 69 welded on the reinforcement pipe 67a, so that the front lateral portion 60e is detachably attached to the stay 69. In addition, the bracket 82 is provided with another through hole 82b.

Figure 10:
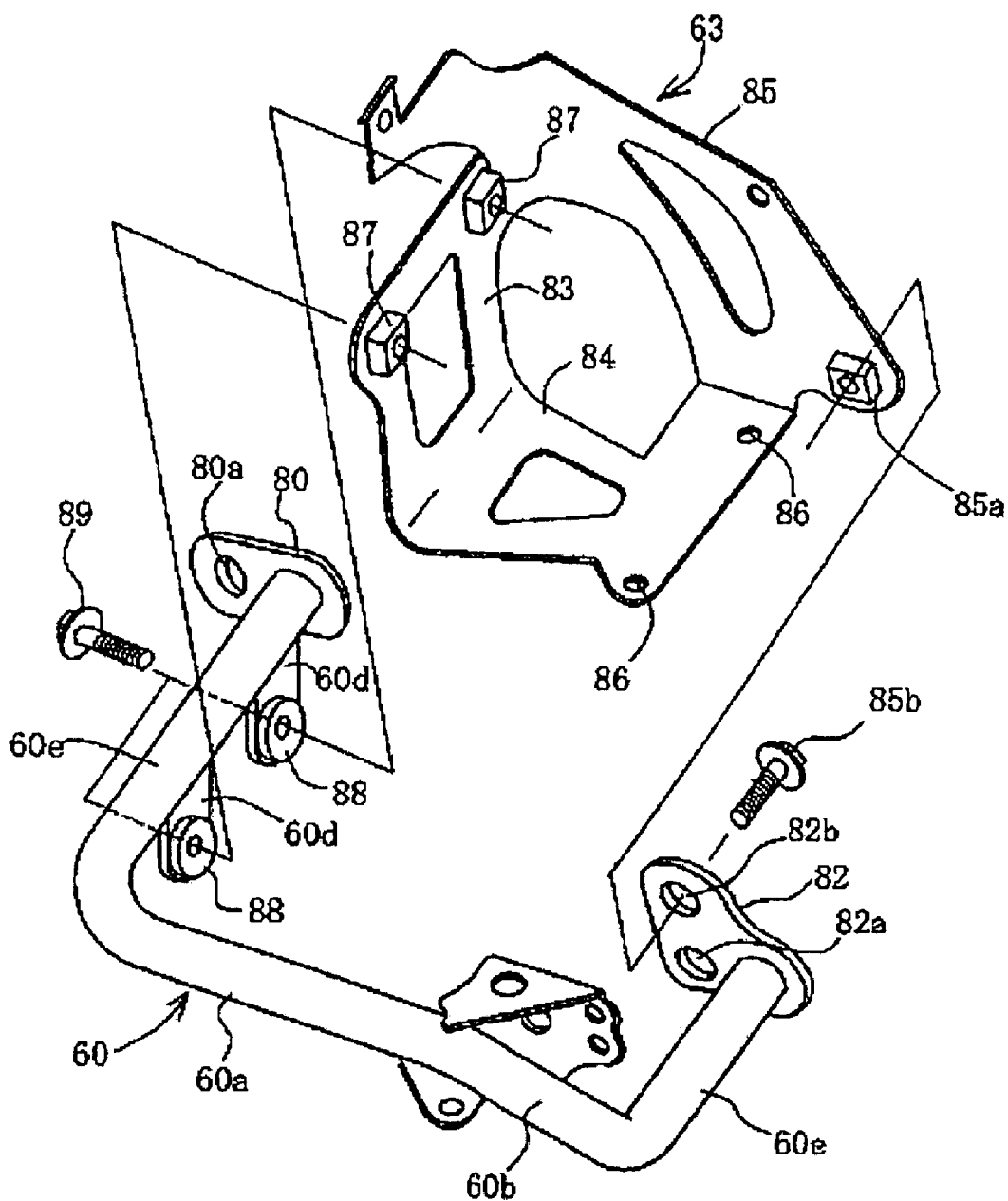
FIG. 10 is a diagram showing how the bracket is attached.

FIG. 10 is a view showing how the bracket 63 is attached. The bracket 63 is to be attached between the rear lateral portion 60c and the front lateral portion 60e. The bracket 63 is a press-molded component provided integrally with a rear wall 83, a bottom wall 84 and an inner-side wall 85. The rear wall 83 extends downward from the rear lateral portion 60c. The bottom wall 84 is bent, and extends forward, from the lower end of the rear wall 83. The inner-side wall 85 joins the inner-side end portion of the front edge of the bottom wall 84 and the inner-side end portion of the upper edge of the rear wall 83 to each other. A mount portion 86 is integrally formed on the outer side of the front edge of the bottom wall 84. The ABS modulator 61 is mounted on the mount portion 86 with the rubber mount (not shown).

Weld nuts 87 are provided to an upper portion of the rear wall 83. The upper portion of the rear wall 83 is placed on the stay 60d provided to the rear lateral portion 60c in a manner that the weld nuts 87 overlap rubbers 88 attached to the stay 60d. Bolts 89 are inserted respectively through the rubbers 88, and are fastened respectively to the weld nuts 87, so that the upper portion of the rear wall 83 is mounted on the stay 60d of the rear lateral portion 60c with the rubbers 88 in between. A weld nut 85a is attached to the front end portion of the inner-side wall 85. The weld nut 85a is placed to overlap the through hole 82b of the bracket 82, and is then fastened with a bolt 85b, so that the front end side of the bracket 63 is attached to the front lateral portion 60e.

As described above, the ABS modulator 61 is configured to be disposed in the space on the side of the inclined portion of the pair of right and left main pipes 21 extending and diverging from the head pipe 20. For this reason, it is possible to dispose the ABS modulator 61 in a relatively large space while preventing the space for the arrangement of other components including the induction system from being compressed. In particular, by disposing the ABS modulator 61 in a space in front of the concave portion 9a for knee grip of the tank cover 9, as well as in front of a position where the width of the front cowl 7 is the largest, it is possible to further facilitate the securing of the arrangement space. In addition, since the ABS modulator 61 is supported by using the pair of right and left main pipes 21 having a high rigidity, the weight of the supporting members is reduced. Moreover, since the ABS modulator 61 can be disposed to a position near the front brake 6, the total length of the pipes can be reduced as much as possible.

A description will now be given of the operating mechanism 64 of the parking brake with reference to FIGS. 8 to 10. The base plate 65 of the operating mechanism 64 is detachably attached to a stay 95 on the main pipe 21 with a bolt 94 (FIG. 8). The stay 95 is positioned in a vicinity of the stay 68 to which the unit supporting stay 60 is attached (see FIG. 9). The operating mechanism 64 and the ABS modulator 61 are supported, close to each other in the front-and-rear direction, on the main pipe 21.

The operating mechanism 64 of the parking brake includes a pivotally-moving plate 71. One end of the pivotally-moving plate 71 is attached to the base plate 65 with an axle 70 so that the pivotally-moving plate 71 pivotally moves about the axle 70. The lower end of the brake cable 14b is joined to a locking portion 71a in the center of the pivotally-moving plate 71. A tension spring 72 is attached to a protruding portion 71b provided between the locking portion 71a and the axle 70, and connects the base plate 65 and the protruding portion 71b so as to bias the pivotally-moving plate 71 pivotally in the counterclockwise direction.

A projection 71d is provided to a tip portion 71c of the pivotally-moving plate 71. The projection 71d moves along an arc portion 65a of the base plate 65 in association with the rotational movement of the operating lever 66, and stops when abutting on a stopper (not shown) provided to one end of the arc portion 65a. In addition, a locking portion 65b protruding onto the rotational trace of the operating lever 66 is formed also in the other end of the arc portion 65a.

The axle 70 is joined to, and united with, a lever arm 73 extending from the operating lever 66 on the side opposite to the pivotally-moving plate 71 and the base plate 65. When the operating lever 66 is pulled rearward so as to rotationally move about the axle 70 in the clockwise direction, the pivotally-moving plate 71 is caused to rotationally move together with the operating lever 66 in the same direction against the elastic force of the tension spring 72. Accordingly, the pivotally-moving plate 71 pulls the brake cable 14b so as to activate the manual caliper 14a to perform the braking.

At this time, once the lever arm 73 rotationally moves over the locking portion 65b, the locking portion 65b restricts the returning movement of the lever arm 73 to the home position.

Pulling the operating lever 66 causes the lever arm 73 to disengage from the locking portion 65b. Then, once the operating lever 66 is released, the pivotally-moving plate 71 is caused to rotationally move in the counterclockwise direction by the elastic force of the tension spring 72 to loosen the brake cable 14b, so that the parking brake 14 is released. The operating lever 66 projects downward from the lower side end portion 7b of the front cowl 7. The other components of the operating mechanism 64 are housed inside the front cowl 7 (see FIGS. 5 and 6). This locking arrangement allows the rotational movement of the operating lever 66 to be locked with a simple structure. It should be noted that the locking structure incorporates a publicly known structure, such as a ratchet mechanism, which allows the locking and releasing operations to be performed by the pulling of the operating lever 66.

In the above-described configuration of the operating mechanism 64 of the parking brake, the operating mechanism 64 of the parking brake is provided inside the front cowl 7 covering from the head pipe 20 to the vicinity of the seat 10. The operating lever 66 is exposed to face the lower side end portion 7b of the front cowl 7 at a position in front of, and in the vicinity of, the front end portion of the seat 10 in the side view. This configuration allows the rider to operate the operating lever 66 without leaning forward to a large extent, so that the operability is improved. On the other hand, since the operating mechanism 64 is housed inside the front cowl 7, it is possible to avoid inadvertent operations even in a case where the operating lever 66 is disposed near the seat 10. In particular, when the operating lever 66 is disposed, in front of the concave portion 9a for knee grip of the tank cover 9, and below the portion where the width of the front cowl 7 is the largest due to the placement of fuel tank, it is possible to easily avoid inadvertent operations.

Moreover, since the operating mechanism 64 is provided to the main pipe 21, it is possible to effectively utilize the main pipe 21 having a high rigidity. At the same time, the operating lever 66 is configured to be able to rotationally move in the front-and-rear direction along the main pipe 21. Therefore, it is possible to operate the operating lever 66 with no interference with the main pipe 21. Moreover, since the operating lever 66 is attached to the right-side main pipe 21 disposed on the right side of the vehicle body, this configuration is advantageous to the right-hand operation.

Figure 11:
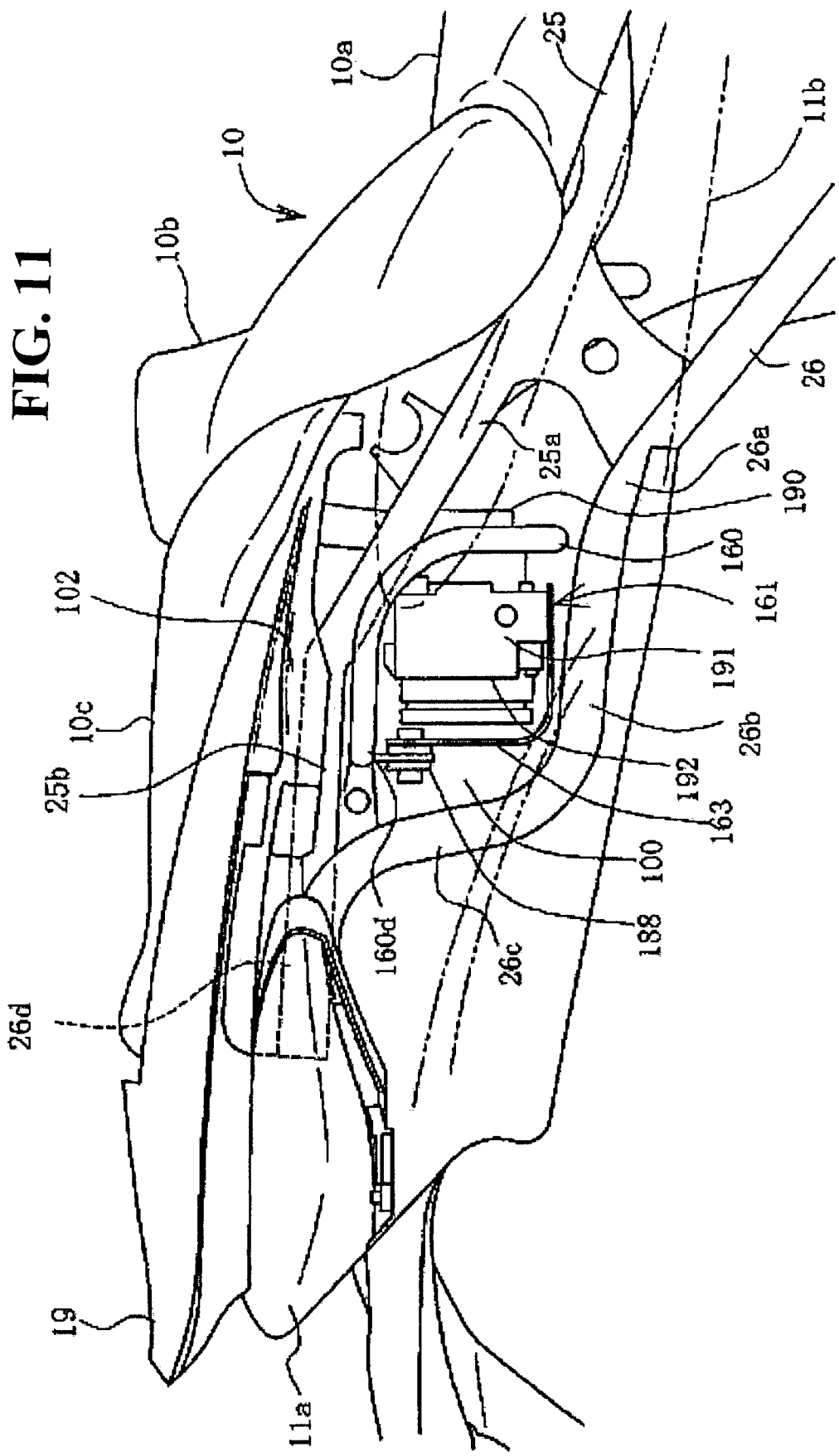
FIG. 11 is a diagram showing the inside of a rear cowl according to a second embodiment.
Figure 12:
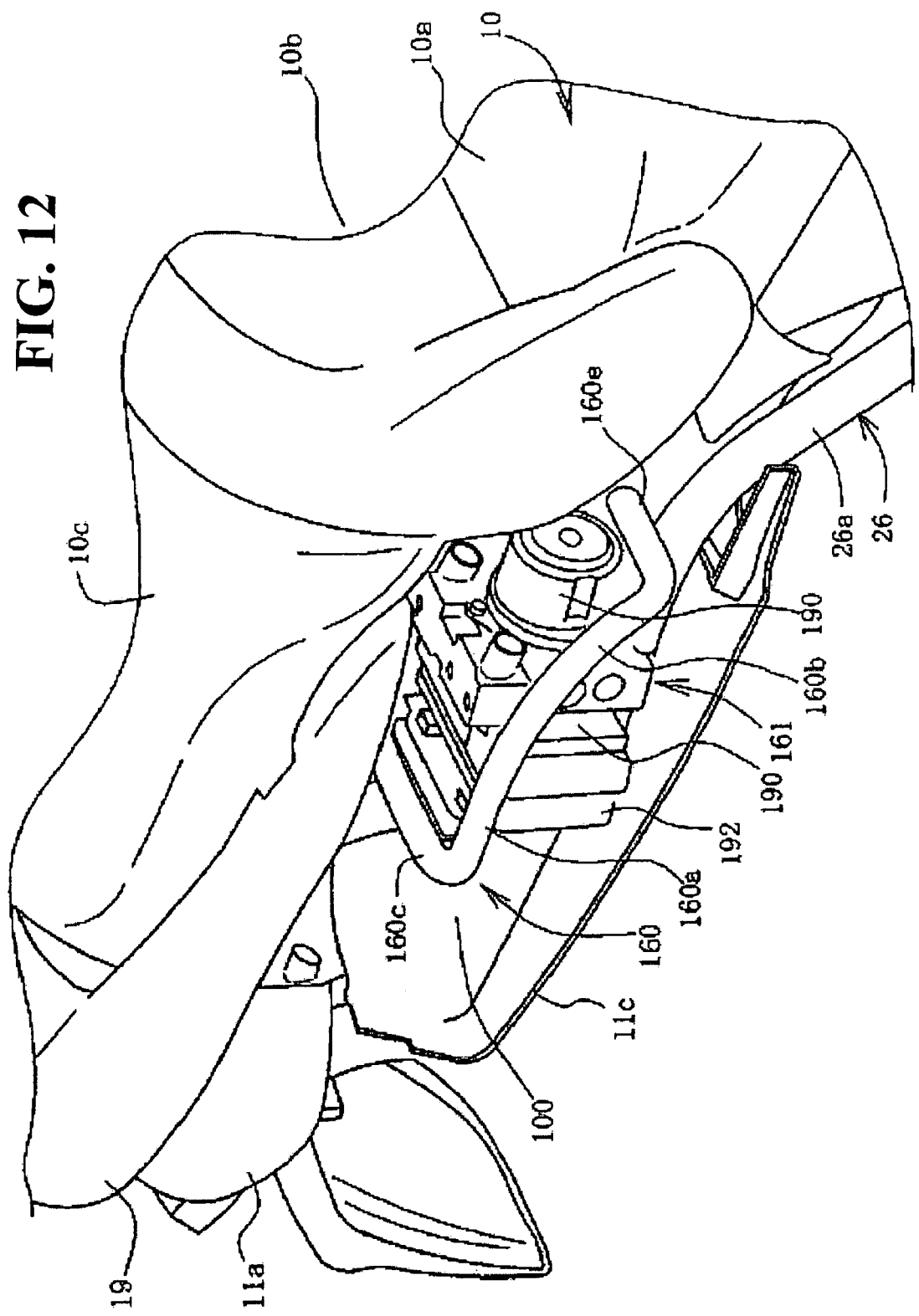
FIG. 12 is a perspective view showing a state where an ABS modulator according to the second embodiment is attached.
Figure 13:
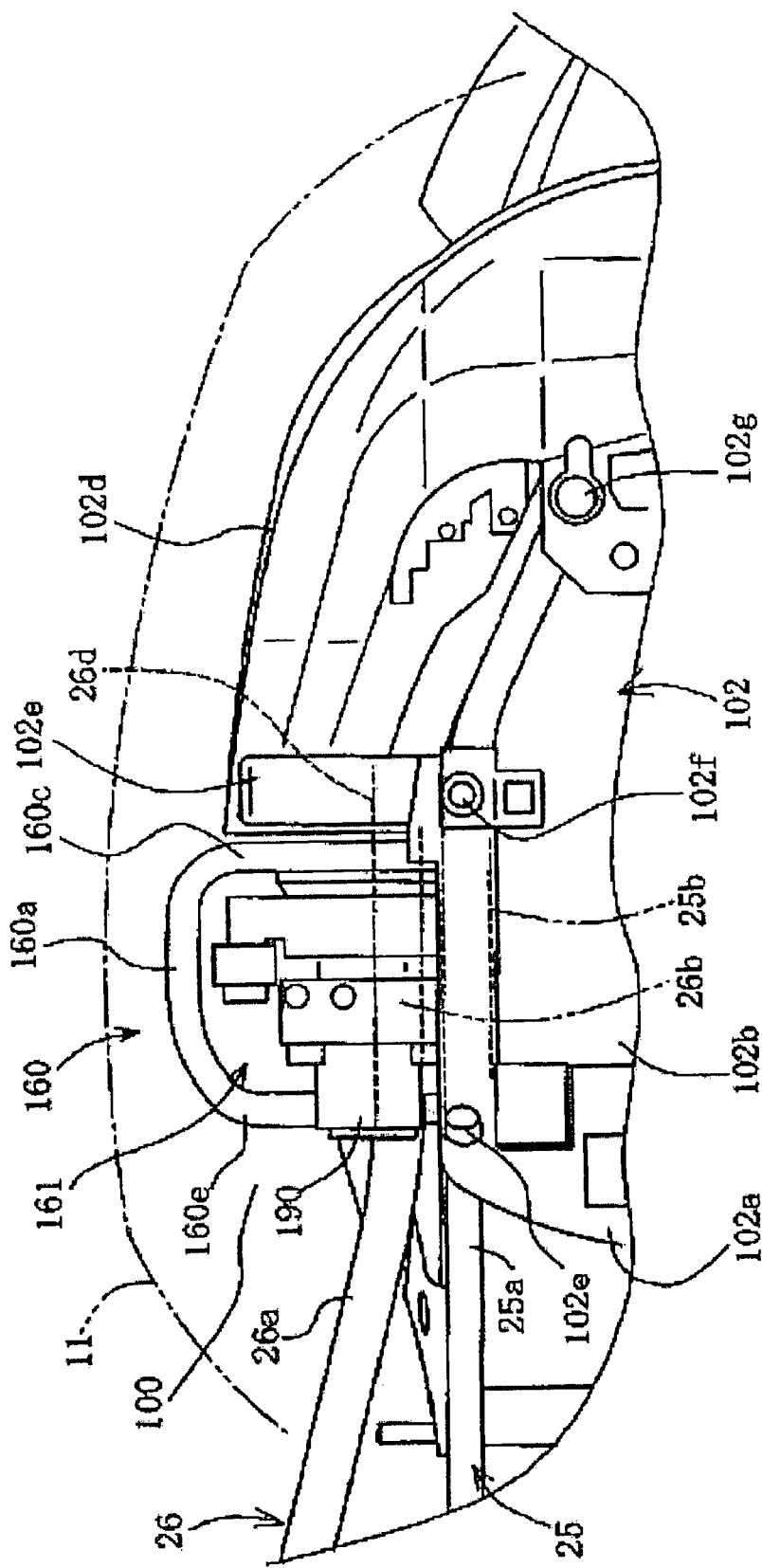
FIG. 13 is a plan view showing the right-side portion of the rear portion of a vehicle body according to the second embodiment.

FIGS. 11 to 13 show another embodiment in which the present invention is applied to an ABS for the rear brake. Since the vehicle, to which the ABS is attached, is the same as that shown in FIG. 1, the same components are provided respectively with the same reference numerals. FIG. 11 shows the inside of the rear cowl 11 in a state where a side panel 11b constituting the side portion of the rear cowl 11 is removed. The rear portion of the rear cowl 11 is configured in a manner where the rear lighting unit 11a is sandwiched by the grab rail 19 and the side panel 11b constituting the side portion of the rear cowl 11. An ABS modulator 161 for the rear brake is housed inside the rear cowl 11, that is, in front of the rear lighting unit 11a.

The seat rail 25 includes an inclined portion 25a and a horizontal portion 25. The inclined portion 25a extends obliquely upward and rearward below the back rest 10b. The horizontal portion 25b is bent substantially horizontally below the rear seat 10c.

The backstay 26 also includes an inclined portion 26a, a horizontal portion 26b, an up-down portion 26c and a horizontal portion 26d, which continue in this order. The inclined portion 26a extends below, and is spaced apart from, the seat rail 25. The horizontal portion 26b extends rearward substantially along the front side portion of the lower end of the rear cowl 11. The up-down portion 26c is bent upward near substantially the middle portion of the rear cowl 11 in the front-and-rear direction, and then extends to the horizontal portion 26b. The horizontal portion 26d is bent rearward again in a manner that the horizontal portion 26d overlaps the up-down portion 26c. A space 100 is formed between the inclined portion 25a and the horizontal portion 25b, and the horizontal portion 26b. An ABS modulator 161 is disposed in the space 100.

A unit supporting stay 160, which has a substantially L-shape in side view, is arranged from the horizontal portion 25b of the seat rail 25 to the horizontal portion 26b and the inclined portion 26a of the backstay 26, in the space 100. The unit supporting stay 160 and the ABS modulator 161 are similar respectively to the unit supporting stay 60 and the ABS modulator 61. The ABS modulator 161 controls the hydraulic pressure of the rear brake 13 so as to avoid the locking of the rear wheel. Although the pipe arrangement is not illustrated, the ABS modulator 161 is connected to the caliper of the rear brake, and is configured to reduce the hydraulic pressure appropriately at the right time to control the braking force.

A bracket 163 similar to the bracket 63 is attached to the unit supporting stay 160. The rear end portion of the bracket 163 is mounted with a rubber 188 on a stay 160d provided to the rear end portion of the unit supporting stay 160. Although not illustrated, the front end portion of the bracket 163 is attached to the backstay 26 in a manner similar to the foregoing embodiment. Reference numeral 102 identifies a cross plate attached on the inclined portion 25a and the horizontal portion 25b. The grab rail 19 is attached to the cross plate 102.

FIG. 12 is a perspective view showing a state where the attachment of the ABS modulator 161 is shown by removing the side panel 11b (see FIG. 11). A bottom portion 11c of the rear cowl 11 also functions as a rear fender, and has an arch-shaped cross section in which the center portion in the vehicle width direction is the highest. Although not illustrated, the side panel 11b is detachably attached to each side portion of the bottom portion 11c with tapping screws. The unit supporting stay 160 and the ABS modulator 161 are housed in a space between the grab rail 19 and the rear seat 10c, and the bottom portion 11c, in a manner that the unit supporting stay 160 and the ABS modulator 161 partly protrude towards the side from the space. In addition, the unit supporting stay 160 and the ABS modulator 161 are disposed, not in the center portion of the bottom portion 11c functioning also as the rear fender, but in the lower position on the outermost side. Accordingly, the unit supporting stay 160 and the ABS modulator 161 are disposed in the uppermost portion on the side of the rear wheel 2. Moreover, the unit supporting stay 160 and the ABS modulator 161 are disposed in a vicinity of the backrest 10b of the rear cowl 11 where the width of the rear cowl 11 is the largest. This makes it easy to secure a space of a sufficient capacity for the disposition, on the side of each of the seat rail 25 and the backstay 26, and on the inner side of the rear cowl 11.

The unit supporting stay 160 includes an upper portion 160a, a front portion 160b, a rear lateral portion 160c and a front lateral portion 160e. The rear lateral portion 160c is provided with the stay 160d in the similar manner to the foregoing embodiment (FIG. 11). The ABS modulator 161 is housed inside the unit supporting stay 160, and includes an electric motor 190, a pump 191 and a solenoid valve 192.

FIG. 13 is a plan view of the right-side portion of the vehicle body, showing how the unit supporting stay 160 is attached. The unit supporting stay 160 has a substantially U-shape in plan view, and is provided in a manner that the unit supporting stay 160 partly protrudes towards the side of the seat rail 25 and the backstay 26. The unit supporting stay 160 is also housed in a space on the inner side of the rear cowl 11. The ABS modulator 161 is surrounded by, and is positioned inside, the unit supporting stay 160. The horizontal portion 26b extends in the front-and-rear direction below the electric motor 190. The position where the ABS modulator 161 is disposed is also a position where the width of the rear cowl 11 is the largest.

In the portion where the unit supporting stay 160 is provided, the seat rail 25 and the backstay 26 are still spaced apart in the left-to-right direction from each other. The rear end portion of the horizontal portion 25b and the rear end portion of the horizontal portion 26d join and integrate with each other in a position on the rear of the unit supporting stay 160.

The cross plate 102 includes a front cross portion 102a, a straight portion 102b, a step portion 102c and a rear cross portion 102d. The front cross portion 102a bridges between the right and left seat rails 25. The straight portion 102b is placed over the horizontal portion 25b. The step portion 102c projects toward the side by substantially the same length as that of the rear lateral portion 160c, along the rear side of the rear lateral portion 160c. The rear cross portion 102d has a substantially U shape starting from the step portion 102c as the front end, and surrounding the rear ends of the respective horizontal portions 25b and 26b, and both sides of the horizontal portions 25b and 26b. The cross plate 102 is attached to the seat rail 25 at bosses 102e, 102f and 102g.

According to the above-described configuration, the ABS modulator 161 for the rear brake can be housed by effectively utilizing the internal space of the rear cowl 11. This makes it possible to facilitate the layout by utilizing the idle space. In addition, since the ABS modulator 161 is covered with the rear cowl 11, the ABS modulator 161 is invisible from the outside. Accordingly, the necessity of performing a process for improving the appearance exclusively for the ABS modulator 161 is eliminated while improving the appearance. Moreover, since the ABS modulator 161 is disposed in the vicinity of the backrest 10b, it is possible to dispose the ABS modulator 161 in the position where the width of the rear cowl 11 is the largest. Accordingly, the total length of the pipes is reduced, so that a simpler pipe arrangement with a smaller weight is achieved. Furthermore, since the ABS modulator 161 is disposed at a high position in the vehicle body, the air bleeding of the hydraulic system is facilitated.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A parking brake system for a motorcycle provided with a parking brake for locking a wheel when the motorcycle is parked, the parking brake system comprising:
   a head pipe, the head pipe supporting a front wheel;
   a front cowl, the front cowl facing downwardly and covering a region from a portion in front of the head pipe to a portion on a front side of a seat disposed in a center of the vehicle body, said front cowl being disposed above said region;
   an operating mechanism including a base plate for the parking brake; and
   an operating lever of the operating mechanism,
   wherein the operating mechanism for the parking brake is disposed in front of the seat, inside the front cowl, and the operating lever is partly exposed downwardly from a lower portion of the front cowl.

2. The parking brake system according to claim 1, further comprising a pair of right and left main pipes extending rearward from the head pipe, wherein the operating mechanism for the parking brake system is fixed to one of the main pipes.

3. The parking brake system according to claim 2 wherein the operating lever for the parking brake is pivotally supported so as to be swingable in the front-and-rear direction along the corresponding main pipe.

4. The parking brake system according to claim 2, wherein the base plate being detachably attached to a stay on the right main pipe by a bolt.

5. The parking brake system according to claim 4, wherein the operating mechanism further comprises:
a pivotally-moving plate attached to the base plate with an axle, the pivotally-moving plate including a locking portion and a protruding portion; and
a brake cable connected between the parking brake and the locking portion;
a tension spring attached between the base plate and the protruding portion for biasing the pivotally-moving plate in a counterclockwise direction.

6. The parking brake system according to claim 5, wherein the axle is joined to a lever arm extending from the operating lever, and when the operating lever is pulled rearwardly to move counterclockwise about the axle, the pivotally-moving plate is caused to rotationally move together with the operating lever in the same direction against the elastic force of the tension spring.

7. The parking brake system according to claim 1, wherein the operating lever is disposed in front of a concave knee grip portion of a fuel tank cover.

8. The parking brake system according to claim 7, wherein the operating lever is disposed below a portion of the front cowl where a width of the front cowl is largest due to placement of a fuel tank of the motorcycle.

9. A motorcycle, comprising:
a body frame, said body frame including a head pipe, a main pipe, a center pipe, a down pipe and a lower pipe;
a seat mounted on the body frame by a seat rail;
a front cowl, the front cowl facing downwardly and covering a region from a portion in front of the head pipe to a portion on a front side of the seat, said front cowl being disposed above said region;
a parking brake mounted on a rear wheel of the vehicle for braking the rear wheel;
an operating mechanism including a base plate for the parking brake, said operating mechanism including a brake cable extending therefrom to the parking brake for operating the parking brake and an operating lever,
wherein the operating mechanism for the parking brake is disposed in front of the seat, inside the front cowl, and the operating lever is partly exposed downwardly from a lower portion of the front cowl.

10. The motorcycle according to claim 9, further comprising a pair of right and left main pipes extending rearward from the head pipe, wherein the operating mechanism for the parking brake system is fixed to one of the main pipes.

11. The motorcycle according to claim 10 wherein the operating lever for the parking brake is pivotally supported so as to be swingable in the front-and-rear direction along the corresponding main pipe.

12. The motorcycle according to claim 10, wherein the base plate being detachably attached to a stay on the right main pipe by a bolt.

13. The motorcycle according to claim 12, wherein the operating mechanism further comprises:
a pivotally-moving plate attached to the base plate with an axle, the pivotally-moving plate including a locking portion and a protruding portion; and
a brake cable connected between the parking brake and the locking portion;
a tension spring attached between the base plate and the protruding portion for biasing the pivotally-moving plate in a counterclockwise direction.

14. The motorcycle according to claim 13, wherein the axle is joined to a lever arm extending from the operating lever, and when the operating lever is pulled rearwardly to move counterclockwise about the axle, the pivotally-moving plate is caused to rotationally move together with the operating lever in the same direction against the elastic force of the tension spring.

15. The motorcycle according to claim 9, wherein the operating lever is disposed in front of a concave knee grip portion of a fuel tank cover.

16. The motorcycle according to claim 15, wherein the operating lever is disposed below a portion of the front cowl where a width of the front cowl is largest due to placement of a fuel tank of the motorcycle.

17. The parking brake system according to claim 1, wherein said front cowl is formed as a monolithic cowl extending from the vicinity of the head pipe to the vicinity of the seat and substantially housing the operating mechanism.

18. The parking brake system according to claim 1, wherein said operating mechanism is housed inside the front cowl in the vicinity of a portion of the front cowl with a largest width.

19. The parking brake system according to claim 1, wherein said operating mechanism is positioned above and rearward of a top portion of a cylinder of an engine, said cylinder of the engine inclining to a front side of the engine.

20. The parking brake system according to claim 1, wherein the operating lever is substantially L-shaped bending outwards.

21. The motorcycle according to claim 9, wherein said front cowl is formed as a monolithic cowl extending from the vicinity of the head pipe to the vicinity of the seat and substantially housing the operating mechanism.

22. The motorcycle according to claim 9, wherein said operating mechanism is housed inside the front cowl in the vicinity of a portion of the front cowl with a largest width.

23. The motorcycle according to claim 9, further comprising an engine including a cylinder inclining to a front side of the engine, wherein the operation mechanism is positioned above and rearward of a top portion of the cylinder.

24. The motorcycle according to claim 9, wherein the operating lever is substantially L-shaped bending outwards.

* * * * *